United States Patent
Floyd et al.

(10) Patent No.: US 7,305,639 B2
(45) Date of Patent: Dec. 4, 2007

(54) METHOD AND APPARATUS FOR SPECIFYING MULTIPLE VOLTAGE DOMAINS AND VALIDATING PHYSICAL IMPLEMENTATION AND INTERCONNECTIONS IN A PROCESSOR CHIP

(75) Inventors: Michael Stephen Floyd, Austin, TX (US); Joshua David Friedrich, Austin, TX (US); Elspeth Anne Huston, Poughkeepsie, NY (US); Wolfgang Roesner, Austin, TX (US); Rick John Weiss, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 11/055,863

(22) Filed: Feb. 11, 2005

(65) Prior Publication Data

US 2006/0184905 A1 Aug. 17, 2006

(51) Int. Cl.
*G06F 17/50* (2006.01)
(52) U.S. Cl. .............................. 716/5; 716/13; 716/18; 703/16; 703/18
(58) Field of Classification Search .................... 716/5, 716/3, 18; 703/16, 18
See application file for complete search history.

(56) References Cited

U.S. PATENT DOCUMENTS

| | | | | |
|---|---|---|---|---|
| 6,086,628 A * | 7/2000 | Dave et al. | ...................... | 716/7 |
| 6,097,886 A * | 8/2000 | Dave et al. | .................... | 703/23 |
| 6,112,023 A * | 8/2000 | Dave et al. | .................... | 703/27 |
| 6,132,109 A * | 10/2000 | Gregory et al. | ............. | 717/131 |
| 6,230,303 B1 * | 5/2001 | Dave | .............................. | 716/7 |
| 7,134,099 B2 * | 11/2006 | Collins et al. | ................. | 716/1 |
| 7,146,303 B2 * | 12/2006 | Roy et al. | ..................... | 703/18 |
| 7,152,216 B2 * | 12/2006 | Kapoor et al. | ................. | 716/4 |
| 2004/0172232 A1 * | 9/2004 | Roy et al. | ..................... | 703/18 |
| 2005/0102644 A1 * | 5/2005 | Collins et al. | ................ | 716/11 |
| 2005/0278676 A1 * | 12/2005 | Dhanwada et al. | ............ | 716/9 |
| 2006/0085770 A1 * | 4/2006 | Kapoor et al. | ................. | 716/4 |

OTHER PUBLICATIONS

Singh et al., "Multi-port equivalencing of external systems for simulation of switching transients", IEEE Transactions on Power Delivery, vol. 10, No. 1, Jan. 1995, pp. 374-382.*
Gothenberg et al., "Performance analysis of sampling switches in voltage and frequency domains using Volterra series", Proceedings of the 2004 International Symposium on Circuits and Systems, vol. 1, May 23-26, 2004, pp. 1765-1768.*

* cited by examiner

*Primary Examiner*—Phallaka Kik
(74) *Attorney, Agent, or Firm*—Duke W. Yee; Diana R. Gerhardt; Cathrine K. Kinslow (57) ABSTRACT

A method, an apparatus and computer instructions are provided for specifying multiple voltage domains of a signal and macros in a processor chip and validating physical implementation and interconnections of the signal and macros. A set of attributes is provided for designs to define multiple voltage domains of a signal and macros in a processor chip. A first validation mechanism is then provided to validate that no electrical or logical errors created by logical connections between macros as defined by the set of attributes. A translation mechanism is provided to translate logical voltage description to a physical netlist for designers to connect powers to macros and signals. A second validation mechanism is provided to validate physical implementation adhere to designers' intent according to the set of attributes defined in the logical design.

19 Claims, 5 Drawing Sheets

METHOD AND APPARATUS FOR SPECIFYING MULTIPLE VOLTAGE DOMAINS AND VALIDATING PHYSICAL IMPLEMENTATION AND INTERCONNECTIONS IN A PROCESSOR CHIP

BACKGROUND OF THE INVENTION

1. Technical Field

The present invention relates to a processor chip. In particular, the present invention relates to specifying multiple voltage domains of a signal and macros in a processor chip using a set of design attributes. Still more particular, the present invention relates to specifying multiple voltage domains of signals and macros in a processor chip using a set of design attributes and validating the logical interconnections and physical implementations of the signal and macros based on the set of design attributes.

2. Description of Related Art

Logic and circuit designers use hardware design tools, such as VHDL or other high-level design language, to design circuit connections and hardware components to be included in a processor chip. However, as processor chips become increasingly complex, more and more units or functions are incorporated into a single piece of silicon, for example, system on a chip. The increase of units or functions leads to difficulty in managing power domains, since each individual unit may require a different power domain. A power domain comprises a number of components that shared the same voltage level. Each power domain may be powered on or off at different times.

In addition, there may be thousands of macros, each comprises a collection of interconnecting transistors, on a given processor chip. Thus, it is very difficult to determine which power domain a macro should be on and ensure that all voltage crossings have the proper conversion circuitry. Furthermore, if one power domain is turned off, protection has to be implemented on other domains.

On the other hand, it is also difficult with the existing design tools for designers to validate the physical implementation of a processor chip with the logical design. For a processor chip, physical implementation is the process of specifying the transistors and the interconnections of those transistors that implement the logical behavior described in the high level design language. Existing design tools fail to provide an adequate solution for validating the voltage connections in the physical implementation, because the connections can only be validated manually. Thus, a designer has to know exactly what power supply all of the components and circuits must use in order to validate the design. In other words, designers have to manually specify each macro's power pin to the correct power grid and manually inspect each voltage connection on the macros to verify correctness.

In addition, there is no synchronization between voltage supply levels defined in the logical design and the physical implementation, since existing design tools fail to carry voltage supply level specified in the logical design to the physical implementation. Thus, mistakes will only be found once the design is implemented in actual hardware. Problems with voltage domains or voltage conversions between macros can result in a non-operational chip or a chip whose operation is significantly limited. Therefore, it would be advantageous to have an improved method that allows designer to specify different power domains of signals and macros in a processor chip, and synchronizes the logical design with physical implementation, such that correctness of the design may be automatically validated in the physical implementation to ensure that logical design is correctly implemented.

SUMMARY OF THE INVENTION

The present invention provides a method, an apparatus, and computer instructions for specifying multiple voltage domains of signals and macros in a processor chip and validating physical implementation and interconnections of the signal and macros. The present invention provides a set of attributes in a design tool for defining a plurality of voltage domains for a plurality of signal and macros. The set of attributes include a power domain attribute identifying a voltage domain for a macro, an actual power domain attribute identifying a voltage domain for a specific instance of the macro, a pin power domain attribute identifying a voltage domain for a pin of a macro, and a pin default power domain attribute identifying a voltage domain for every pin of a macro.

The present invention also provides a first validation mechanism, a translation mechanism and a second validation mechanism. The first validation mechanism validates interconnections of the plurality of signals and macros based on the set of defined attributes. The first validating mechanism determines if one of an electrical and a logical error is created between interconnections of the plurality of signals and macros based on the set of defined attributes on the high level design language model alone.

If one of an electrical and a logical error is created between interconnections of the plurality of signals and macros based on the set of defined attributes, the first validation mechanism generates interconnection violations to allow designers to make fixes. However, if one of an electrical and a logical error is not created between interconnections of the plurality of signals and macros based on the set of defined attributes, the first validation mechanism generates a list of voltage interface signals, which can be subsequently used in simulating test cases to emulate behavior of the chip when certain regions of the processor chip are powered off.

The translation mechanism translates the plurality of voltage domains as defined by the set of attributes in the high level design language to a physical netlist for the plurality of signals and macros. The physical netlist provides physical description of circuit components and is used in building the processor chip. The second validation mechanism validates physical connections for the plurality of signals and macros based on the set of defined attributes. The translation mechanism translates the logical voltage description of the plurality of signals and macros defined by the set of attributes to the physical netlist to instruct designers or downstream tools how to connect appropriate voltages to the plurality of signals and macros using transistors on the plurality of voltage domains.

The second validation mechanism determines if physical connections on the actual hardware design implementation for the plurality of signals and macros use correct voltages based on the set of defined attributes, and determines if one of an electrical error and an incorrectly cross voltage domain connection between macros is found.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method, apparatus and computer instructions for specifying multiple voltage domains of a signal and macros in a processor chip and validating the physical implementation and interconnection of the signal and macros. In the context of the present invention, the terms 'power domain' and 'voltage domain' are used interchangeably.

In a preferred embodiment, the present invention provides a set of attributes in a design tool, such as VHDL, for designers to specify voltage domains of functional blocks (macros) and input/output signals of those blocks in a processor chip. By using the set of attributes to specify the desired voltage domains of signals and macros, downstream design tools or hardware designers may connect voltage pins on macros and signals correctly.

Traditionally, in the logical design high level language, voltage pins for a macro are implied. This means that the power pins and ground pins of a macro are not defined. With the use of the set of attributes, designers may indicate to downstream design tools what voltage domain should a macro be connected to and what voltage the interface signals of the macro are on. This domain and interface specification is critical because some circuit types only function correctly on particular voltage domains and because it is possible to create electrical failures in the chip by improperly interfacing signals on different voltage domains.

In addition to a set of attributes, the present invention provides a first validation mechanism for validating that no electrical or logical problems are created by the logical connections between macros or voltage domains as specified by the set of attributes. This ensures that the logical design is sound before physical implementation.

The first validation mechanism ensures that, during physical implementation, no voltage domain is crossed without a proper translator. A translator is a buffer circuit that resolves differences in voltage between two voltage domains. For example, if one voltage domain is 1 volt and another voltage domain is 1.5 volt, a translator is needed to resolve the difference. If the voltage level is changing from a low voltage to a high voltage for example, from 1 volt to 1.5 volt, a buffer translator needs to be added to boost the voltage. However, if the voltage level is changing from a high voltage to a low voltage, for example, from 1.5 volt to 1 volt, a buffer translator is needed to force the voltage to go down a level.

If no problems are detected by the first validation mechanism, the present invention provides a translation mechanism that translates logical voltage description defined by the set of attributes into a physical netlist.

The physical netlist provides a physical description of circuit components and parameters for designers to connect the appropriate powers to the macros and buffer signals using transistors on the appropriate voltage domain.

Once logical design is translated to physical implementation, the present invention provides a second validation mechanism for validating that physical voltage connections for macros and signals use the correct voltage and do not create electrical failures or incorrectly cross power domains. In other words, the second validation mechanism ensures that actual electrical connections adhere to designers' intent by performing the same validation that first validation mechanism did, but with actual signals and buffers in the physical netlist that will be manufactured to create the processor chip. Since additional signals and buffers are included in the physical implementation, the second validation mechanism ensures that these added buffers and signals, which are assigned to a macro on the processor chip, are following the physical netlist generated by the translation mechanism.

Figure 1:
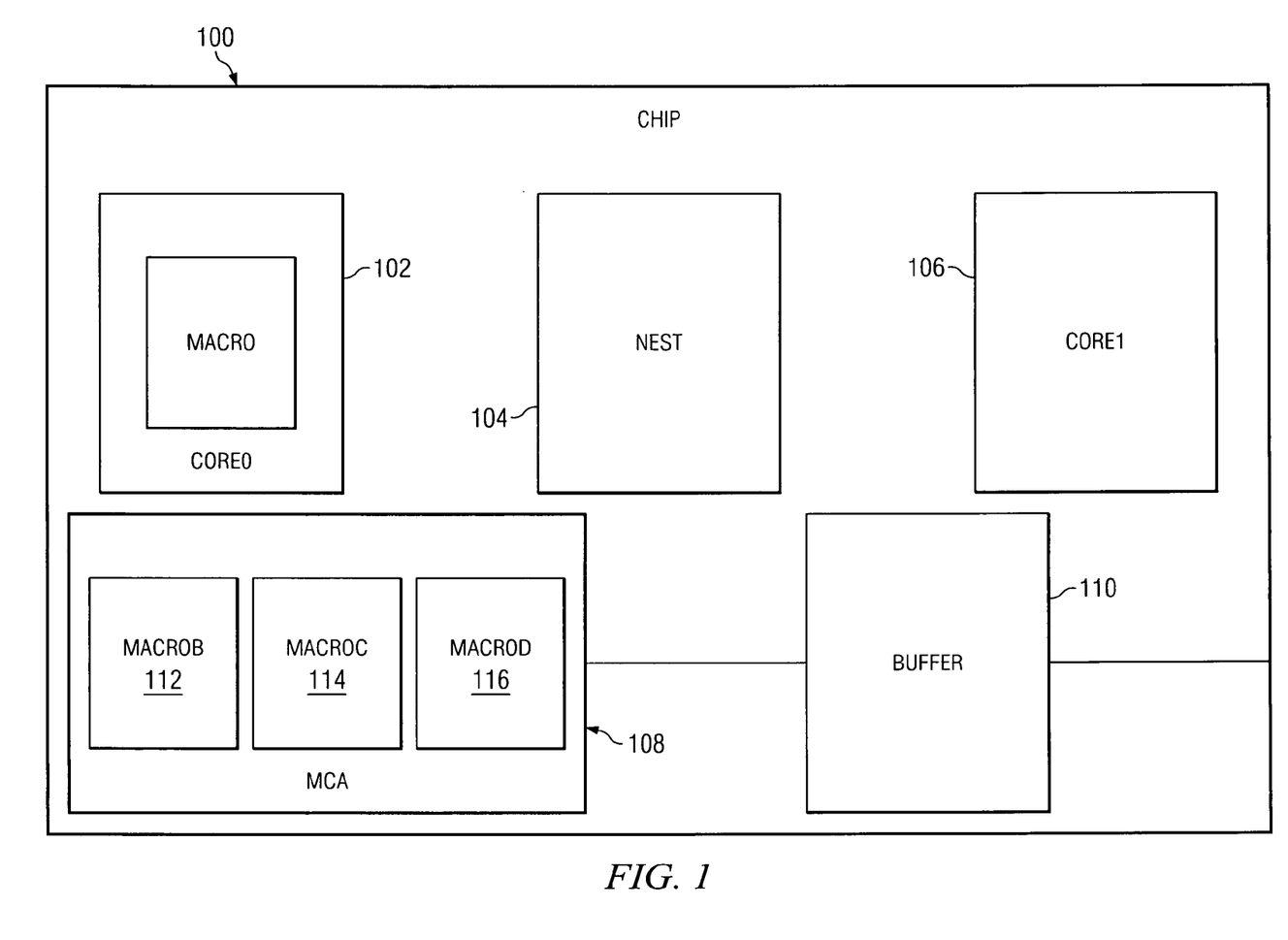
FIG. 1 is a diagram illustrating an exemplary processor chip in accordance with a preferred embodiment of the present invention.

Turning now to FIG. 1, a diagram illustrating an exemplary processor chip is depicted in accordance with a preferred embodiment of the present invention. As depicted in FIG. 1, processor chip 100 includes a number of components, such as core0 102, nest 104, core1 106, MCA 108 and buffer 110. Core0 102 and core1 106 are processor cores. Each processor core has it own voltage level in order to reduce power consumption. There is a single macro defined in core0 102 and a number of macros defined in MCA 108, including macroB 112, macroC 114, and macroD 116. A macro is a collection of transistors in a processor chip. Each macro may have a different power level.

Buffer 110 is used here as a macro by itself, since it facilitates signal distribution between different macros over long distance. The present invention provides a set of attributes in a design tool, such as VHDL, for designers to specify multiple voltage domains of a signal and macros in a processor chip. One of the set of attributes is a power domain attribute. The power domain attribute specifies which power domain a macro is on. If a macro has multiple power domains, a list of power domains separated by a comma is specified.

Figure 2:
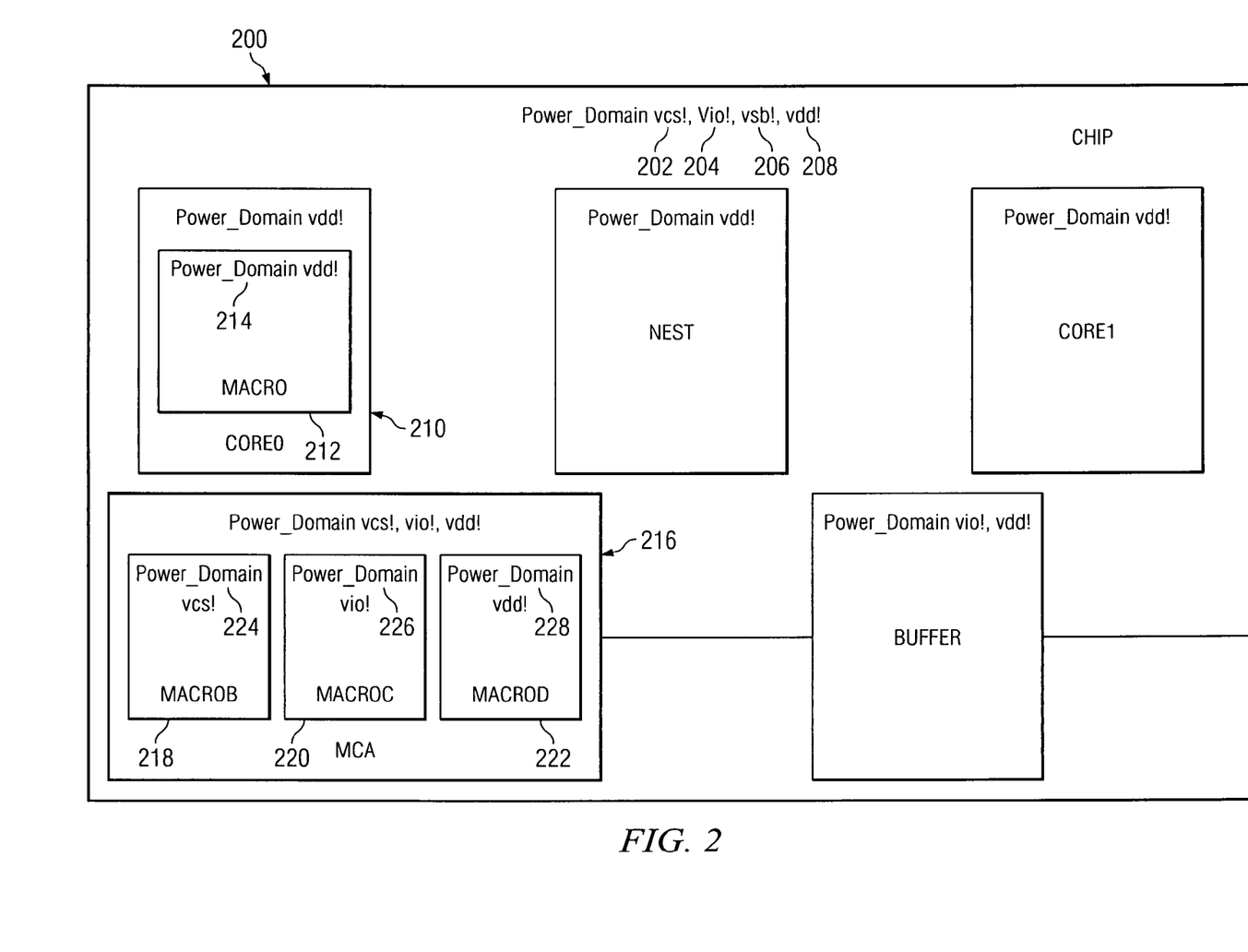
FIG. 2 is a diagram illustrating an exemplary processor chip with actual power domain attributes defined in accordance with a preferred embodiment of the present invention.

Turning now to FIG. 2, a diagram illustrating an exemplary processor chip with actual power domain attributes defined is depicted in accordance with a preferred embodiment of the present invention. As depicted in FIG. 2, processor chip 200 is similar to processor chip 100, except that designers had specified a power domain attribute for processor chip 200, which includes 4 different voltage levels, named vcs 202, vio 204, vsb 206, and vdd 208.

As shown in FIG. 2, each of the voltages specified for processor chip 200 is separated by a comma and a '!' symbol, which indicates to the design tool to determine a power signal. Similar to processor chip 100 in FIG. 1, processor chip 200 also includes a number of components, each of which has its own power domain requirements. Core0 210 includes macro 212, which has a power domain of vdd 214. MCA 216 includes three macros, macroB 218, macroC 220, and macroD 222. MacroB 218 has a power domain of vcs 224. MacroC 220 has a power domain of vio 226. MacroD 222 has a power domain of vdd 228. Since MCA 216 instantiates these macros, MCA 216 has to carry the superset of all power domain values used by the entities inside its entire hierarchy. Thus, MCA 216 includes multiple power domains separated by a comma, including vcs, vio, and vdd for macroA, B, and C.

The present invention also provides a second attribute, actual power domain attribute, in the set of attributes to allow designers to assign actual power domain of the hierarchy of the instance to the power domain of the entity. Thus, a new power domain may be assigned to a new instance of the same entity by using the actual power domain attribute. The actual power domain attribute is necessary in order to prevent the need to replicate the high level design for each similar instance of a region of the chip if the only difference is the voltage domain. For example, if the processor chip has two or more processor cores, placing each processor core in its own voltage domain allows independent control of power to each core. In this case, it would be impractical to replicate the entire high level design for each core. Therefore, the actual power domain attribute provides the ability to specify actual power domain for each instance.

Figure 3:
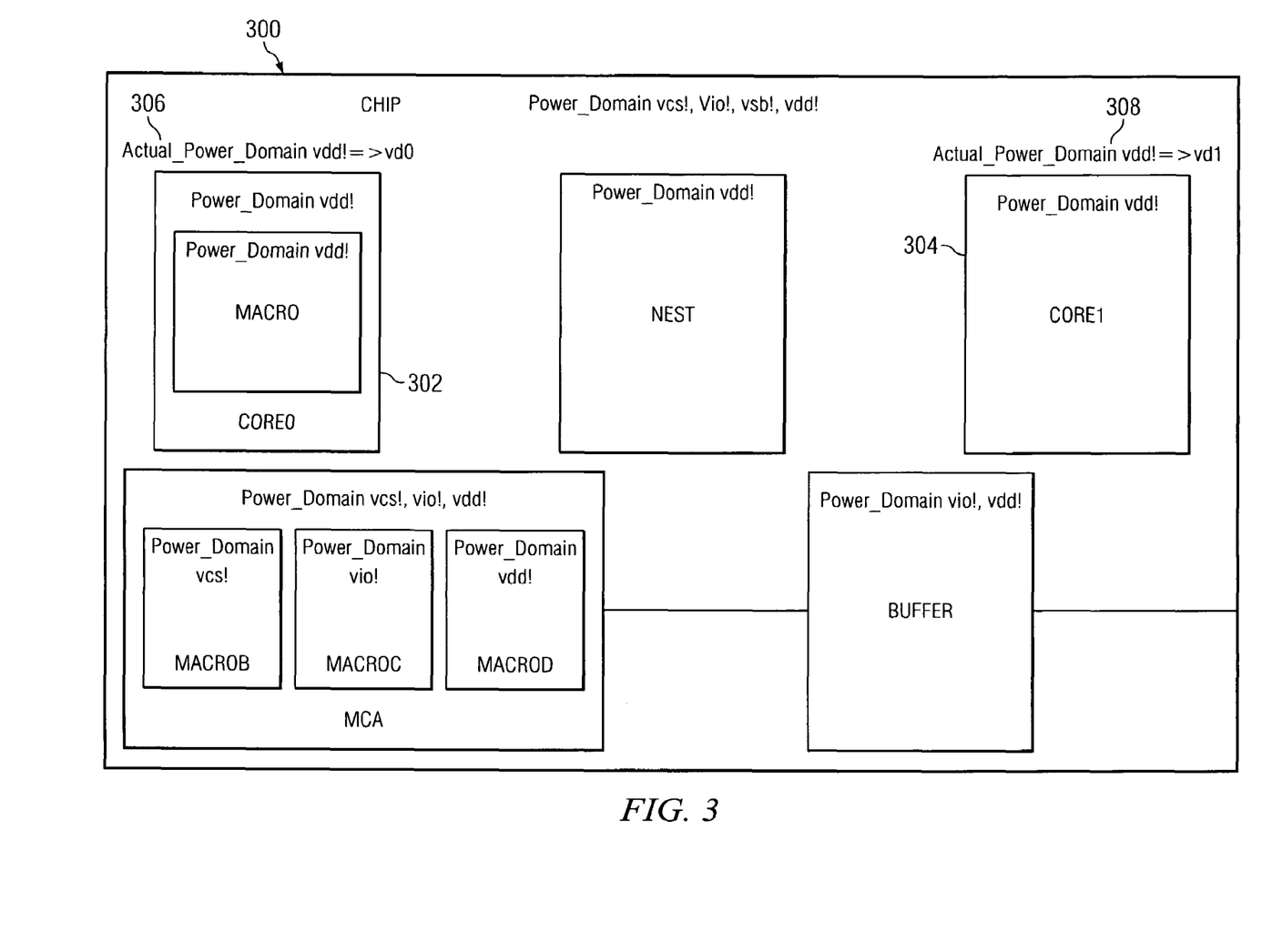
FIG. 3 is a diagram illustrating an exemplary processor chip with actual power domain attributes defined in accordance with a preferred embodiment of the present invention.

Turning now to FIG. 3, a diagram illustrating an exemplary processor chip with actual power domain attributes defined is depicted in accordance with a preferred embodiment of the present invention. As shown in FIG. 3, processor chip 300 is similar to processor chip 200 in FIG. 2. However, core0 302 and core1 304 are assigned an actual power domain.

Core0 302 is assigned an actual power domain of vd0 306, which overrides the power domain default of vdd for the core0 entity. Core1 304 also is assigned an actual power domain of vd1 308, which overrides the power domain default of vdd for the core1 entity. Core0 302 and core1 304 have different power domains, because core1 304 may be a clone of core0 except with different power requirement. Therefore, the actual power domain attributes are used to define different power requirements between core0 302 and core1 304.

The interface signals (pins) of any macro with only one power domain are implicitly assumed to use that single power domain. For macros that have multiple power domains, every entity pin of the macro must have power domains specified so that the interface connections can be explicitly known and validated. The present invention provides a third attribute, a pin power domain attribute, and a fourth attribute, a pin default power domain attribute, in the set of attributes to allow designs to specify power domain on every pin or a combination of two attributes. Since only one power domain is possible per pin, the pin power domain attribute overrides the pin default power domain attribute if both are specified.

Figure 4:
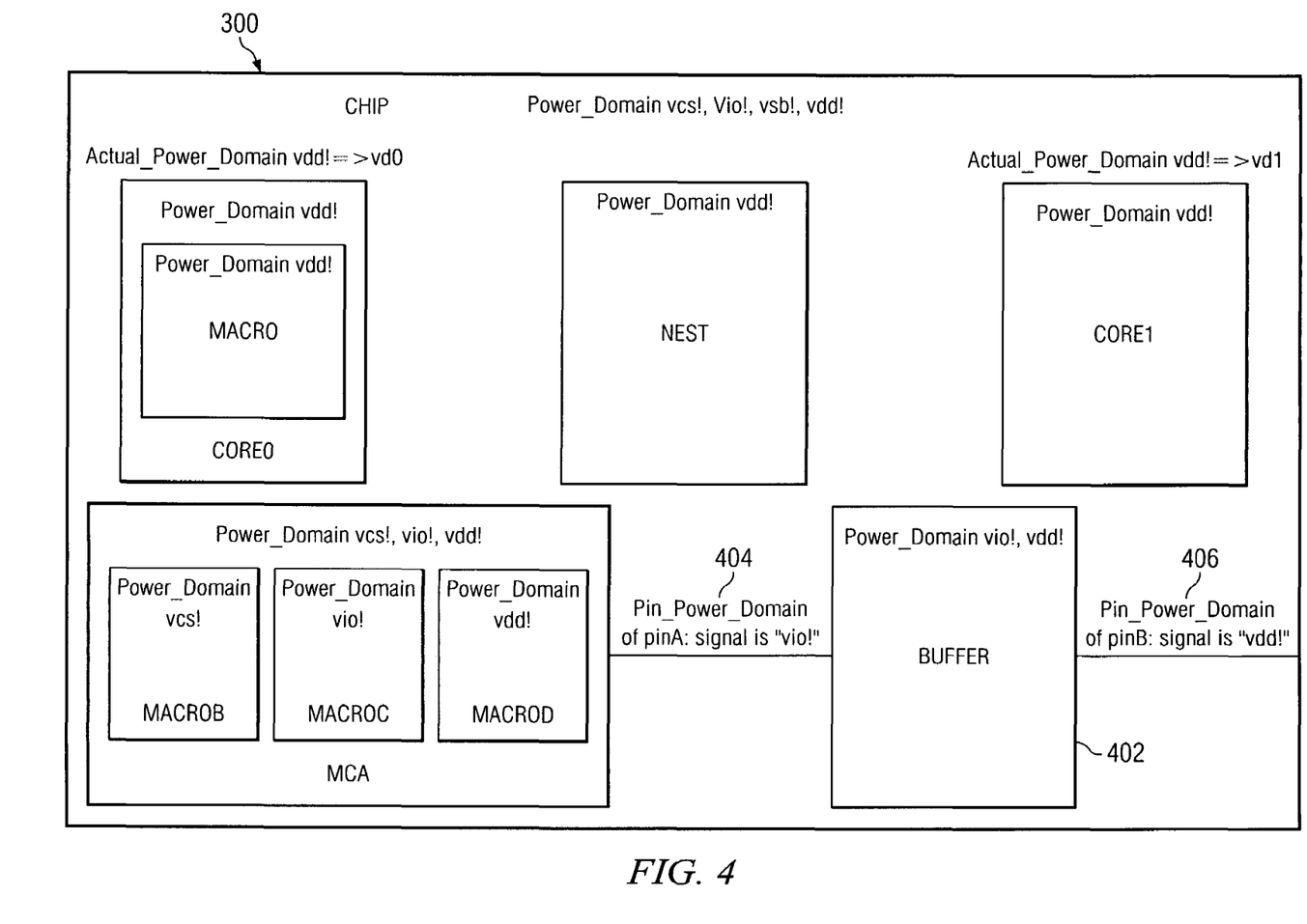
FIG. 4 is a diagram illustrating an exemplary processor chip with pin power domain attributes defined in accordance with a preferred embodiment of the present invention.

Turning now to FIG. 4, a diagram illustrating an exemplary processor chip with pin power domain attributes defined is depicted in accordance with a preferred embodiment of the present invention. As shown in FIG. 4, processor chip 400 is similar to processor chip 300 in FIG. 3, except that buffer 402 includes two pin power domains for each of its pins. The two pin power domains include pin_power_domain of pin A 404, which has a signal of vio, and pin_power_domain of pin B 406, which has a signal of vdd. Thus, by using the pin power domain attributes, power domain may be defined for a given pin of an entity.

As mentioned above, the fourth attributes, the pin default power domain attribute may be used to assign a default power domain to all of the pins of an entity instead of specifying the pin power domain attribute on every pin. Thus, with the pin default power domain attribute defined, a default power domain may be propagated to all individual pins. However, if a pin power domain attribute is specified on a specific pin, the pin default power domain attribute is overridden. For example, if a pin default power domain is vdd for a macro of 100 pins, a pin power domain of vsb may be defined for one of the 100 pins.

As mentioned above, in addition to a set of attributes for specifying power domains of a signal and macros in a processor chip, the present invention provides a first validation mechanism for validating that no electrical or logical problems are created by the logical connections between macros or voltage domains as specified by the set of attributes. The first validation mechanism checks the consistency of the set of attributes defined and determines whether the connectivity between power domains follows legal topology, for example, whether the right set of level translators has been inserted between the power domains.

In a preferred embodiment, the first validation mechanism is known as a voltage island power checker or VIPER. VIPER analyzes the logical model generated from the high level design language. VIPER first ensures consistent labeling of entities within a processor chip and their nested entities with power domains. VIPER also ensures that the superset list on hierarchical entities that contain entities with different domains is complete. In addition, VIPER propagates all pin power domain attributes and pin default power domain attributes upward through the design hierarchy, from the macro until all multi-domain entities have only pins that are classified with their power domain. VIPER then checks all signals and flags any signal that connects source/sinks of different power domains as a potential error. VIPER provides a report of any failing signals found during validation. With this report, engineers may correct the problem before physical design resource is invested in making an erroneous connection.

In addition, the present invention provides a translation mechanism that translates logical voltage description as defined by the set of attributes into a physical netlist, for use by designers to connect the appropriate powers to the macros and buffer signals using transistors on the appropriate voltage domain.

In the prior art, there is no automated synchronization of voltage domains between the logical design and the physical implementation. Thus, in order for the designers to determine what transistors to use for building a macro, a designer has to ask another designer what voltage level is used. This process is cumbersome, time-consuming, and often error-prone considering there are thousands of macros in a processor chip.

With the translation mechanism of the present invention, designers no longer have to ask other designers to determine what voltage level should be used, since the logical voltage description as defined by other designers using the set of attributes is translated into a physical netlist. With the physical netlist, designers and automated tools may quickly and correctly identify what voltage level is used and thus determine what transistors to use in order to accommodate the voltage requirement.

In addition to the translation mechanism, the present invention provides a second validation mechanism for validating that physical voltage connections for macros and signals use the correct voltage and do not create electrical failures or incorrectly cross power domains. In a preferred embodiment, the second validation mechanism is known as Global Echk. Global Echk takes a physical implementation and validates that it obeys the connection rules, since new buffers or signals are added and assigned to macros in a processor chip during physical implementation. Global Echk also determines if the physical connections between power domains adhere to the physical netlist that is generated by the translation mechanism. Global Echk also determines if any electrical error occurs. In this way, designers' intent in the logical design is fully validated at the physical level.

Figure 5:
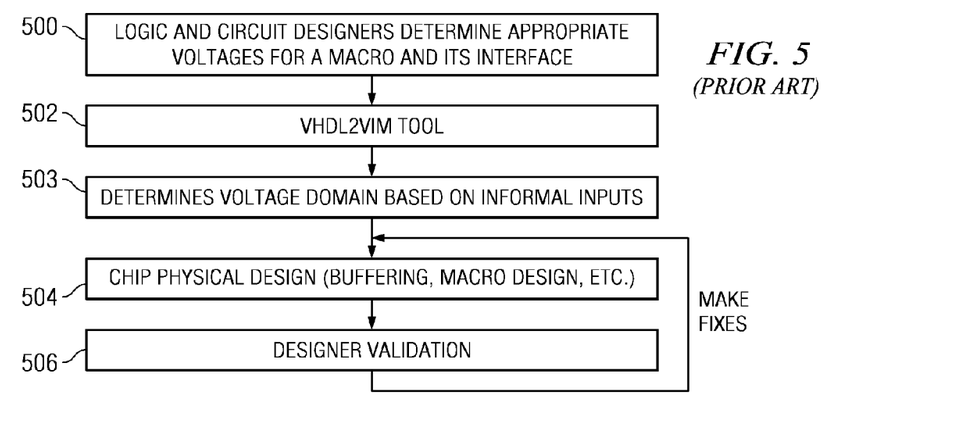
FIG. 5 is a flowchart of known process for handling multiple power domains in a processor chip.

Turning now to FIG. 5, a flowchart of previously known process for handling multiple power domains in a processor chip is depicted. As depicted in FIG. 5, the process begins when logic and circuit designers determines the appropriate voltages for a macro and its interface (step 500). Traditionally, once designers determine the appropriate voltages for a macro, other designers, who are designing a connecting macro or other parts of the circuit, have to ask the designers what voltage level to use, in order to decide what transistors to use for their own portion. This communication typically is performed by using informal communications to other designers, for example, via email or other inter-office communication means. From the determined voltages, other designers may decide what transistors to use in order to build the processor chip. Next, designers may use a tool, such as VHDL2VIM tool, to create the physical netlist for the processor chip, which contains no information about voltage domains (step 502). Physical designers and CAD tools would then determine, again based on informal inputs such as text files, e-mails, and phone calls, the intended voltage domains of the macros and signals from other designers (Step 503). The logical design is then implemented in the physical chip design by adding buffers and signals (step 504). Finally, the designers validate manually by inspection that the physical implementation, with added buffers and signals, adhere to connection rules (step 506) and make fixes if necessary. Thus, the process terminates thereafter.

Figure 6:
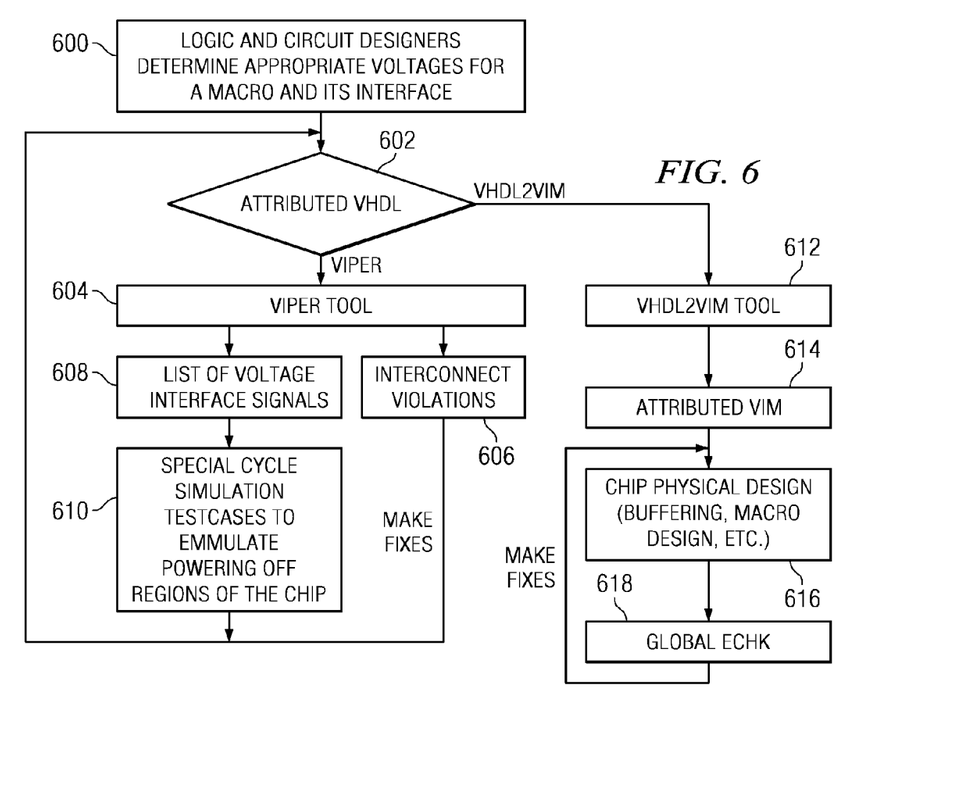
FIG. 6 is a flowchart of an exemplary process for logic and circuit designers to determine the appropriate voltages for a macro and its interface using mechanisms of the present invention in accordance with a preferred embodiment of the present invention.

Turning now to FIG. 6, a flowchart of an exemplary process for logic and circuit designers to determine the appropriate voltages for a macro and its interface using mechanisms of the present invention is depicted in accordance with a preferred embodiment of the present invention.

As shown in FIG. 6, the process begins when logic and circuit designers determine the appropriate voltages for a macro and its interface (step 600). The logic and circuit designers may define multiple power domains of a signal and macros using the set of attributes provided by the present invention in a design tool (step 602). In this way, other designers may determine the proper voltage levels to use in order to build the processor chip based on what attributes are defined in the set of attributes.

Next, based on the logical design defined in the design tool, designers may now use a first validation mechanism of the present invention or VIPER to validate that no electrical or logical error created by the logical connections between macros based on the defined set of attributes (step 604). If an electrical or logical error is found during validation in step 604, VIPER generates interconnection violations, which notify the designers that the connection rules have been violated (step 606). In turn, the process returns to step 602, where the designers may adjust the set of attributes defined in the design tool, to step 604 to revalidate the logical design before attempting to implement an incorrect physical design.

Turning back to step 604, if no electrical or logical error is found during validation, a list of voltage interface signals that cross voltages are generated by VIPER (step 608). An example of a cross voltage may be from vcs to vdd. Based on the list of voltage interface signals, the designers may simulate test cases to emulate powering off regions of the chip. Thus, a bad portion of the chip may be powered down (step 610), while the rest of the chip is running. This allows designers to perform debug on certain regions of the chip and make necessary fixes. The process then returns to step 602 to change the set of attributes and step 604 to perform validation until no other errors are found.

On the other hand, return to step 602, if the logical designers decides to implement the logical design, the designers may use a tool, such as VHDL2VIM tool, to create the physical netlist for the chip. (step 612). With the prior art, there is no synchronization between the logical design and physical implementation contained within the netlist. However, with the translation mechanism of the present invention, the physical netlist is automatically populated with the information needed for other designers to quickly identify what voltage level is used and thus determine what transistors to use in order to accommodate the voltage requirement. The physical netlist (step 614) enables other designers to build a processor chip according to the power domain requirements without the need of inquiring the requirements via informal communications. The logical design is then implemented in the physical chip design by adding buffers and signals (step 616).

Finally, the second validation mechanism automatically validates that the physical implementation, with the added buffers and signals, adhere to connection rules as defined by the set of attributes (step 618). Instead of validation by designers, the second validation mechanism validates that physical voltage connections for macros and signals use the correct voltage and do not create electrical failures or incorrectly cross power domains. Thus, the second validation mechanism ensures that actual electrical connections adhere to designers' intent by performing the same validation that first validation mechanism did, but with actual signals and buffers. If fixes are needed, the designers are notified. Thus, the process terminates thereafter.

In summary, the present invention provides an improved method for specifying multiple power domains of a signal and macros in a processor chip and validating the physical implementation and interconnections of the signal and macros. By using the mechanisms of the present invention, designers may indicate to other designers of different power domain requirements associated with different signals and macros. In addition, designers may build a processor chip based on a generated physical netlist without the need of asking other designers what voltage level is used, which also further enables automated tools to implement the design. Furthermore, designers may determine if the physical implementation and interconnection of signals and macros adhere to their intent.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for specifying multiple voltage domains of a signal and macros in a processor chip and validating physical implementation and interconnections of the signal and macros, the method comprising:
    providing a set of attributes in a design tool for defining in a logical design a plurality of voltage domains for a plurality of signals and macros;
    validating logical interconnections of the plurality of signals and macros in the logical design based on the set of defined attributes;
    translating the plurality of voltage domains as defined by the set of attributes to a physical netlist for the plurality of signals and macros;
    using the physical netlist to implement the logical design into a physical implementation on the processor chip; and
    validating physical connections for the plurality of signals and macros in the physical implementation based on the set of defined attributes.

2. The method of claim 1, wherein the set of attributes include a power domain attribute identifying a voltage domain for a macro, an actual power domain attribute identifying a voltage domain for an instance of the macro, a pin power domain attribute identifying a voltage domain for a pin of a macro, and a pin default power domain attribute identifying a voltage domain for every pin of a macro.

3. The method of claim 2, wherein the actual power domain attribute overrides the power domain attribute and wherein the pin power domain attribute overrides the pin default power domain attribute.

4. The method of claim 1, wherein the validating interconnections step comprises:
    determining if one of an electrical and a logical error is created between interconnections of the plurality of signals and macros based on the set of defined attributes; and
    if one of an electrical and a logical error is created between interconnections of the plurality of signals and macros based on the set of defined attributes, generating interconnection violations to allow designers to make fixes.

5. The method of claim 4, further comprising:
    if one of an electrical and a logical error is not created between interconnections of the plurality of signals and macros based on the set of defined attributes, generating a list of voltage interface signals; and
    simulating test cases to emulate behavior of the processor chip when regions of the processor chip are powered off.

6. The method of claim 1, wherein the translating step comprises:
    translating logical voltage description of the plurality of signals and macros defined by the set of attributes to the physical netlist for designers to connect appropriate powers to the plurality of signals and macros using transistors on the plurality of voltage domains.

7. The method of claim 1, wherein the validating physical connections step comprises:
    determining if physical connections for the plurality of signals and macros use correct voltages based on the set of defined attributes; and
    determining if one of an electrical error and an incorrectly cross voltage domain is found.

8. A data processing system for specifying multiple voltage domains of a signal and macros in a processor chip and validating physical implementation and interconnections of the signal and macros, the data processing system comprising:
    a processor;
    a memory connected to the processor via a processor bus; and
    a storage device, wherein the storage device stores a set of attributes for a design tool, wherein the set of attributes defines in a logical design a plurality of voltage domains for a plurality of signals and macros;
    wherein the processor is adapted to execute computer implemented instructions to:
    validate logical interconnections of the plurality of signals and macros in the logical design based on the set of defined attributes; translate the plurality of voltage domains as defined by the set of attributes to a physical netlist for the plurality of signals and macros; use the physical netlist to implement the logical design into a physical implementation on the processor chip; and validate physical connections for the plurality of signals and macros in the physical implementation based on the set of defined attributes.

9. The data processing system of claim 8, wherein the set of attributes include a power domain attribute identifying a voltage domain for a macro, an actual power domain attribute identifying a voltage domain for an instance of the macro, a pin power domain attribute identifying a voltage domain for a pin of a macro, and a pin default power domain attribute identifying a voltage domain for every pin of a macro.

10. The data processing system of claim 9, wherein the processor is adapted to execute computer implemented instructions to further:
    generate a list of voltage interface signals, if one of an electrical and a logical error is not created between interconnections of the plurality of signals and macros based on the set of defined attributes; and
    simulate test cases to emulate behavior of the processor chip when regions of the processor chip are powered off.

11. The data processing system of claim 8, wherein the processor is adapted to execute computer implemented instructions to further:
    determine if one of an electrical and a logical error is created between interconnections of the plurality of signals and macros based on the set of defined attributes; and
    generate interconnection violations to allow designers to make fixes, if one of an electrical and a logical error is created between interconnections of the plurality of signals and macros based on the set of defined attributes.

12. The data processing system of claim 8, wherein the processor is adapted to execute computer implemented instructions to further:

translate logical voltage description of the plurality of signals and macros defined by the set of attributes to the physical netlist for designers to connect appropriate powers to the plurality of signals and macros using transistors on the plurality of voltage domains.

13. The data processing system of claim 8, wherein the processor is adapted to execute computer implemented instructions to further:

determine if physical connections for the plurality of signals and macros use correct voltages based on the set of defined attributes; and determine if one of an electrical error and an incorrectly cross voltage domain is found.

14. A computer program product embodied in a computer readable medium for specifying multiple voltage domains of a signal and macros in a processor chip and validating physical implementation and interconnections of the signal and macros, the computer program product comprising:

first instructions for providing a set of attributes in a design tool for defining in a logical design a plurality of voltage domains for a plurality of signals and macros;

second instructions for validating logical interconnections of the plurality of signals and macros in a logical design based on the set of defined attributes;

third instructions for translating the plurality of voltage domains as defined by the set of attributes to a physical netlist for the plurality of signals and macros;

using the physical netlist to implement the logical design into a physical implementation on the processor chip; and fourth instructions for validating physical connections for the plurality of signals and macros in the physical implementation based on the set of defined attributes.

15. The computer program product of claim 14, wherein the second instructions comprise:

first sub-instructions for determining if one of an electrical and a logical error is created between interconnections of the plurality of signals and macros based on the set of defined attributes; and second sub-instructions for generating interconnection violations to allow designers to make fixes, if one of an electrical and a logical error is created between interconnections of the plurality of signals and macros based on the set of defined attributes.

16. The computer program product of claim 15, further comprising:

third sub-instructions for generating a list of voltage interface signals, if one of an electrical and a logical error is not created between interconnections of the plurality of signals and macros based on the set of defined attributes; and fourth instructions for simulating test cases to emulate behavior of the processor chip when regions of the processor chip are powered off.

17. The computer program product of claim 14, wherein the third instructions comprise:

first sub-instructions for translating logical voltage description of the plurality of signals and macros defined by the set of attributes to the physical netlist for designers to connect appropriate powers to the plurality of signals and macros using transistors on the plurality of voltage domains.

18. The computer program product of claim 14, wherein the fourth instructions comprise:

first sub-instructions for determining if physical connections for the plurality of signals and macros use correct voltages based on the set of defined attributes; and second sub-instructions for determining if one of an electrical error and an incorrectly cross voltage domain is found.

19. The computer program product of claim 14, wherein the set of attributes include a power domain attribute identifying a voltage domain for a macro, an actual power domain attribute identifying a voltage domain for an instance of the macro, a pin power domain attribute identifying a voltage domain for a pin of a macro, and a pin default power domain attribute identifying a voltage domain for every pin of a macro.

* * * * *